US 6,912,946 B2

(12) United States Patent
Haerr et al.

(10) Patent No.: US 6,912,946 B2
(45) Date of Patent: Jul. 5, 2005

(54) SYSTEM AND METHOD FOR IMPROVED CONTROLLED AIRFLOW WITHIN A VACUUM BOOSTER SYSTEM

(75) Inventors: Timothy A. Haerr, Enon, OH (US); Gary C. Fulks, Dayton, OH (US); Ryan M. Elking, Miamisburg, OH (US); Derek T. Dreischarf, Kettering, OH (US); Patrick T. MacLellan, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/446,588

(22) Filed: May 28, 2003

(65) Prior Publication Data

US 2004/0237770 A1 Dec. 2, 2004

(51) Int. Cl.[7] .................................................. F15B 9/10
(52) U.S. Cl. ..................................................... 91/376 R
(58) Field of Search ............................. 91/376 R, 519, 91/369.2, 369.3

(56) References Cited

U.S. PATENT DOCUMENTS 5,181,769 A * 1/1993 Schiel et al. ............. 303/113.3
5,890,775 A * 4/1999 Tsubouchi et al. ........ 91/376 R

* cited by examiner

Primary Examiner—F. Daniel Lopez
(74) Attorney, Agent, or Firm—Michael D. Smith

(57) ABSTRACT

The present invention includes a system for providing an improved controlled airflow within a vacuum booster system. The system includes a vacuum booster assembly having a primary chamber and a secondary chamber, and an outer tube having a first end and a second end, the first end in communication with the secondary chamber of the vacuum booster assembly. The system additionally includes an airflow control assembly operably coupled to the second end of the outer tube, and an inner tube, concentric to the outer tube, having a first end and a second end, the first end operably coupled to the airflow control assembly, the second end in communication with the primary chamber of the vacuum booster assembly. In the system, air flows from the primary chamber of the vacuum booster assembly to the airflow control assembly within the inner tube and air flows from the airflow control assembly to the secondary chamber of the vacuum booster assembly within the outer tube.

19 Claims, 5 Drawing Sheets

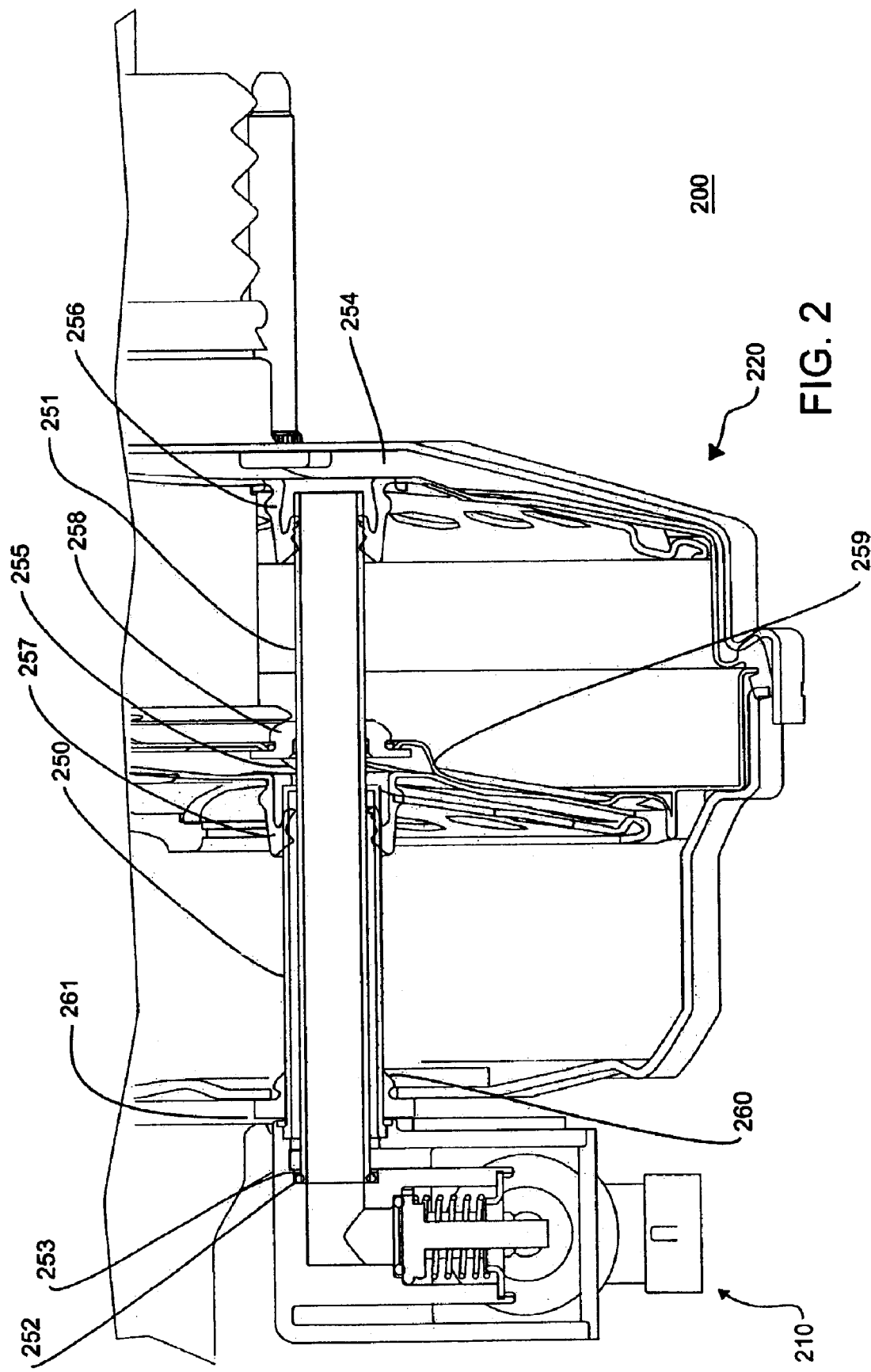

SYSTEM AND METHOD FOR IMPROVED CONTROLLED AIRFLOW WITHIN A VACUUM BOOSTER SYSTEM

FIELD OF THE INVENTION

The technical field of this disclosure is brake systems, and more particularly, vacuum booster systems utilizing solenoid valve control methodology in combination with a vacuum booster diaphragm subassembly.

BACKGROUND OF THE INVENTION

Brake systems are exposed to and require protection from numerous elements, such as, for example weather. Existing brake systems typically are of hydraulic methodology and require large amounts of pressure within the system to operate. Anti-lock brake systems are becoming more prevalent throughout the industry and require an additional amount of pressure within the system to function properly. Additionally, certain weather condition, such as, for example extreme cold can degrade hydraulic performance and require additional amounts of pressure to be available within the system for the system to function as designed.

Typically, brake systems employ vacuum boosters to provide an amplification of force within the system. Existing vacuum booster technology utilizes some form of engine vacuum to create a pressure differential across one or more diaphragms to provide a pressure differential and thus, load amplification. This phenomenon can take place in both single, and tandem vacuum boosters, in which there may be one or two working chambers. Unfortunately, this configuration is limited to an increase of approximately fifteen (15) pounds per square inch (psi) of vacuum that is then converted into output force. The force is converted to hydraulic pressure by the master cylinder. In certain conditions, such as the weather conditions mentioned above, the response of the system pressure can be delayed significantly due to the increase, in viscosity and other frictional factors.

A conventional solution to the aforementioned problem has been to introduce a secondary pump, also referred to as a pre-charge pump, to the system to improve the system response. Unfortunately, the inclusion of a pre-charge pump within the system entails the use of additional hydraulic lines and the addition of a separate port from the system reservoir to provide fluid to the vacuum side of the pre-charge pump.

Additionally, although pre-charge pumps provide needed additional pressure there is an amount of time required to provide the additional pressure, called a response time, or subsequent requirements for pressure. Unfortunately, anti-lock brake systems generally have a requirement for pressure to be delivered very quickly and frequently. The advent of anti-lock brake systems has generated a need create a system that can provide additional system pressure delivered in a quick and frequent manner.

It would be desirable, therefore, to provide a system that would overcome these and other disadvantages.

SUMMARY OF THE INVENTION

One aspect of the invention includes a system for providing an improved controlled airflow within a vacuum booster system. The system includes a vacuum booster assembly having a primary chamber and a secondary chamber. The system further includes an outer tube having a first end and a second end, the first end in communication with the secondary chamber of the vacuum booster assembly. The system additionally includes an airflow control assembly operably coupled to the second end of the outer tube. The system further includes an inner tube, concentric to the outer tube, having a first end and a second end, the first end operably coupled to the airflow control assembly, the second end in communication with the primary chamber of the vacuum booster assembly. In the system, air flows from the primary chamber of the vacuum booster assembly to the airflow control assembly within the inner tube and air flows from the airflow control assembly to the secondary chamber of the vacuum booster assembly within the outer tube.

Another aspect of the invention includes a method for providing airflow from a primary chamber to a secondary chamber of a vacuum booster assembly by flowing air along a first path from a primary chamber of the vacuum booster assembly to an airflow control assembly, and flowing air along a second path, concentric to the first path, from the airflow control assembly to a secondary chamber of the vacuum booster assembly.

According to yet another aspect of the present invention, a system for providing airflow from a primary chamber to a secondary chamber of a vacuum booster assembly is provided. The system includes means for flowing air along a first path from a primary chamber of the vacuum booster assembly to an airflow control assembly. The system additionally includes flowing air along a second path, concentric to the first path, from the airflow control assembly to a secondary chamber of the vacuum booster assembly.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

BRIEF DESCRIPTION OF THE DRAWINGS

FIG. 2 is a cross sectional view illustrating an apparatus for providing airflow from a primary chamber to a secondary chamber of a vacuum booster assembly, within a vacuum booster system, according to another embodiment of the present invention;

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices.

DETAILED DESCRIPTION OF THE PRESENTLY PREFERRED EMBODIMENT

Figure 1A:
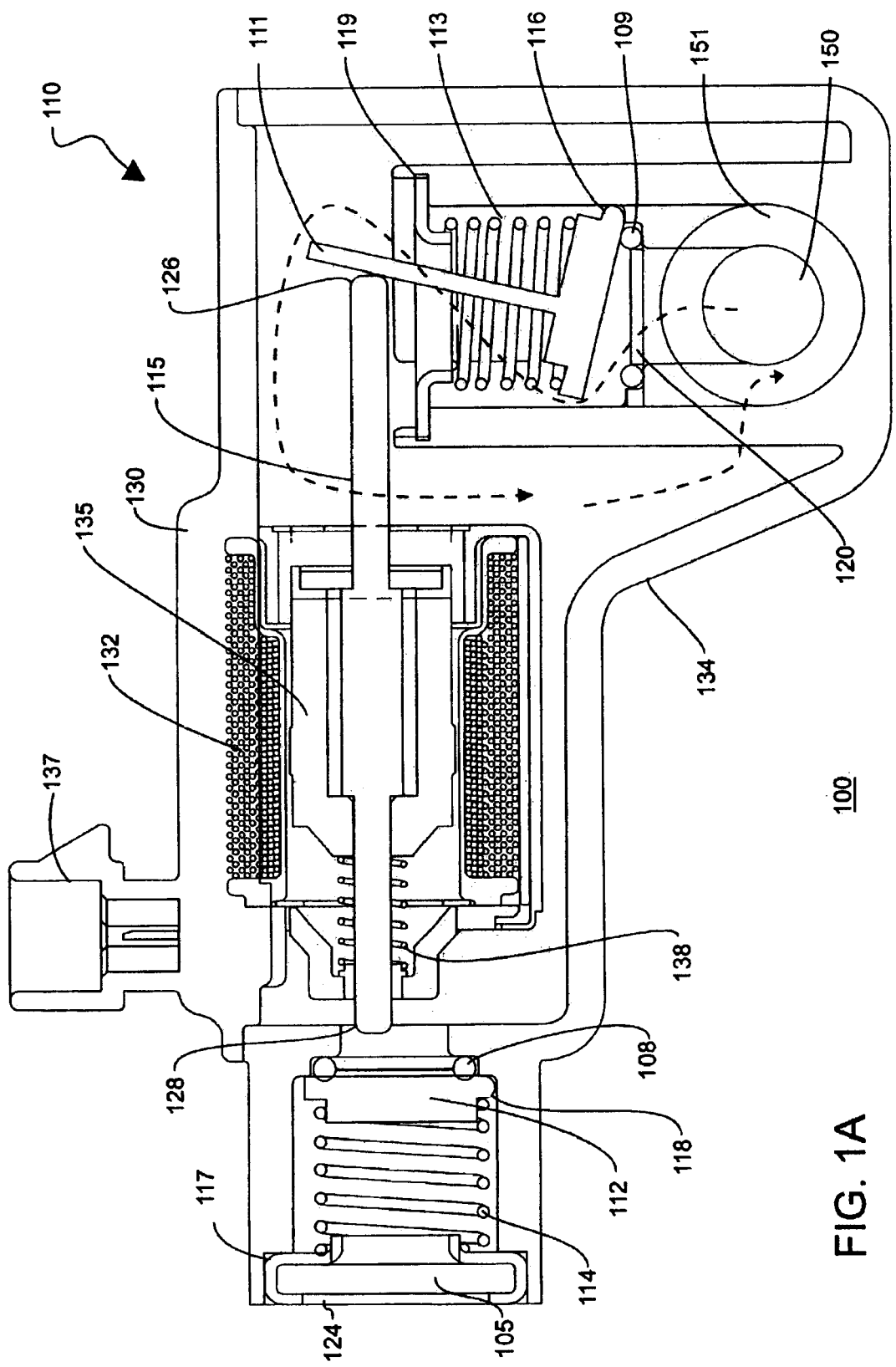
FIG. 1A is a cross sectional view illustrating an airflow control assembly that is providing system airflow to a vacuum booster according to an embodiment of the present invention.
Figure 1B:
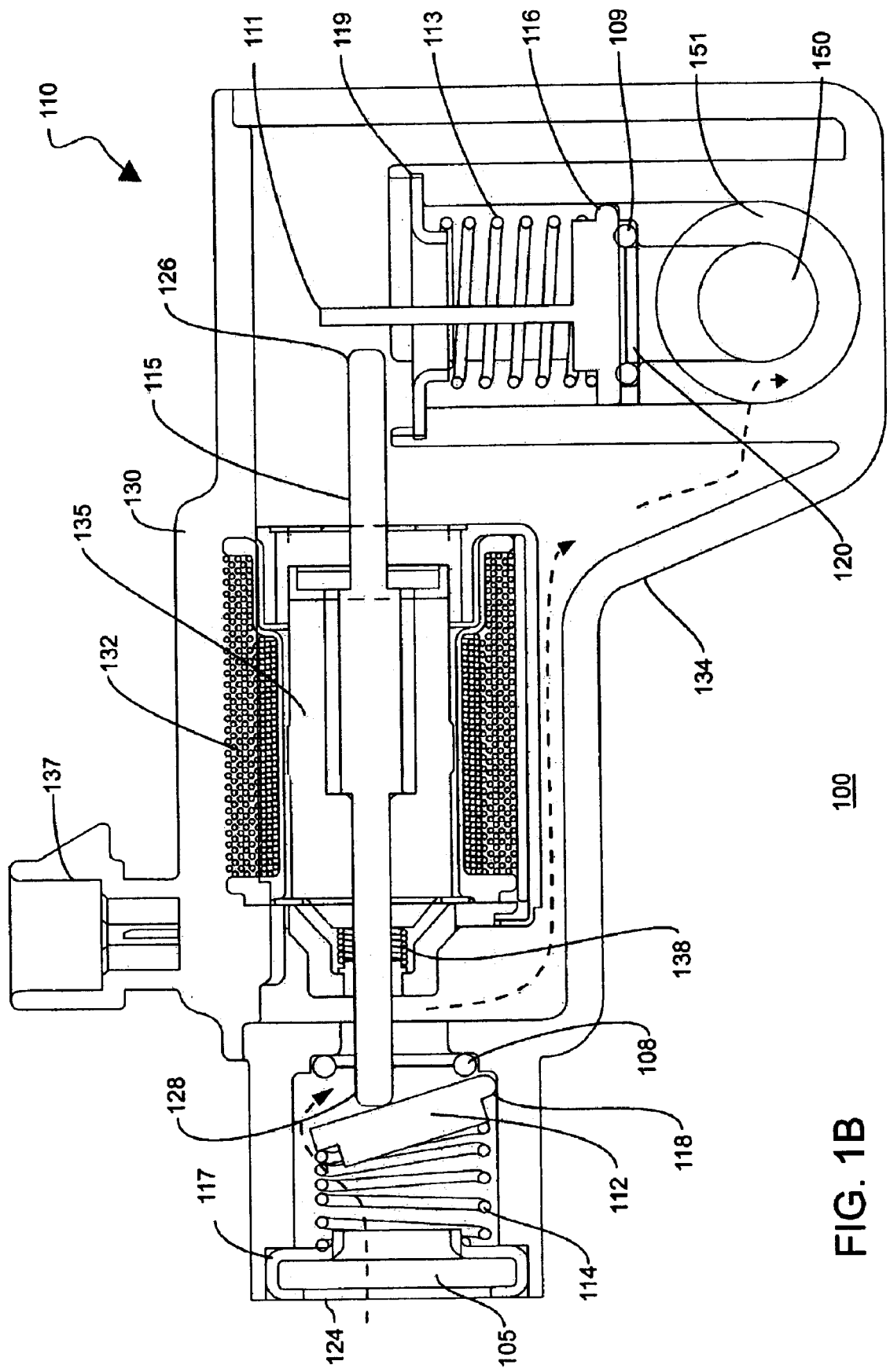
FIG. 1B is a cross sectional view illustrating an airflow control assembly that is providing atmospheric airflow to a vacuum booster according to another embodiment of the present invention.

FIGS. 1A and 1B are cross sectional views illustrating an airflow control assembly 100 that is in accordance with the present invention. FIGS. 1A and 1B detail an embodiment of an apparatus for controlling vacuum within a brake system in accordance with the present invention. In an example, airflow control assembly 100 is implemented as a modified solenoid valve assembly as described in an application filed under Ser. No. 10/115,652 on Apr. 4, 2002 and titled SOLENOID VALVE, VACUUM BOOSTER DIAPHRAM, AND VACUUM BOOSTER ASSEMBLY, assigned to the assignee of this application.

Referring to FIGS. 1A and 1B, airflow control assembly 100 includes solenoid valve housing 110, solenoid actuation rod 115, first and second tip valves (111 and 112), and inner and outer tubes (150 and 151). Solenoid actuation rod 115 includes first and second ends 126 and 128. Solenoid valve housing 110 includes first and second valve ports 120 and 124. First valve port 120 is an incoming valve port. In one embodiment, incoming valve port 120 is coupled to inner tube 150.

Isolation tip valve 111 is actuated by first end 126 of solenoid actuation rod 115 to allow or block fluid passage through first valve port 120. Actuating tip valve 111 opens first valve port 120 and allows fluid to flow. When fluid is allowed to flow, fluid transits solenoid valve housing 110 from inner tube 150 through first valve port 120 and to outer tube 151.

Atmospheric tip valve 112 is actuated by second end 128 of solenoid actuation rod 115 to allow or block fluid passage through second valve port 124. Actuating tip valve 112 opens second valve port 124 and allows fluid to flow. When fluid is allowed to flow, fluid transits solenoid valve housing 110 from an exterior environment through second valve port 124 and to outer tube 151.

FIG. 1A illustrates solenoid actuation rod 115 actuated to the right with isolation tip valve 111 open and atmospheric tip valve 112 closed. FIG. 1B illustrates solenoid actuation rod 115 actuated to the left with atmospheric tip valve 112 open and isolation tip valve Ill closed.

In an example, first and second valve ports 120 and 124 are pneumatic ports wherein second valve port 124 is an atmospheric port and airflow control assembly 100 additionally includes air filter 105. Air filter 105 is designed to remove debris from fluid flowing into airflow control assembly 100 when atmospheric tip valve 112 is in the open position.

Solenoid valve housing 110 includes a cover and coil assembly 130 having main body 134. Cover and coil assembly 130 additionally includes solenoid coil 132, armature 135, and connector 137. In one embodiment, cover and coil assembly 130 is manufactured from a plastic material, such as, for example a polymer. In this embodiment, cover and coil assembly 130 is over-molded over solenoid coil 132 and connector 137. In such an embodiment, main body 134 is manufactured from a plastic material, such as, for example a polymer.

Cover and coil assembly 130 is coupled to main body 134. In an example, cover and coil assembly 130 is sonically welded to main body 134. In another example, cover and coil assembly 130 is fastened to main body 134.

Airflow control assembly 100 additionally includes seals 108 and 109 for isolation tip valve 111 and atmospheric tip valve 112 respectively. In one embodiment, the seals are elastomeric seals. In an example, elastomeric seals 108 and 109 are over-molded over main body 134. In another example, elastomeric seals 108 and 109 are over-molded over isolation tip valve 111 and atmospheric tip valve 112 respectively.

Main body 134 is internally shaped to retain isolation tip valve 111 and atmospheric tip valve 112 as well as air filter 105. Main body 134 further includes first and second valve ports 120 and 124.

Isolation tip valve 111 includes an elongated, rounded first edge 116. First end 126 of solenoid actuation rod 115 pivots isolation tip valve 111 about first edge 116. Such construction allows operation of isolation tip valve 111. Atmospheric tip valve 112 includes an elongated, rounded second edge 118. Second end 128 of solenoid actuation rod 115 pivots atmospheric tip valve 112 about second edge 118.

Each tip valve 111 and 112 is coupled to a respective spring 113 and 114 that closes the respective tip valve when force associated with solenoid actuation rod 115 is removed. The springs 113 and 114 provide the initial force to seal the respective tip valve 111 and 112 on the respective seals (108 and 109) over-molded on main body 134. The tip valves 111 and 112 are designed so that a pressure differential provides additional force to seal the valves 11 and 112, when the valves are closed.

In operation and referring to FIG. 1A, isolation tip valve 111 is open and atmospheric tip valve 112 is closed. When airflow control assembly 100 is in this configuration, it is referred to as a de-energized position. Air flows from first valve port 120, which is in communication with the primary chamber of the vacuum booster assembly (not shown) via inner tube 150 through solenoid valve housing 110 to outer tube 151, which is in communication with-the secondary chamber of the vacuum booster assembly (not shown).

Referring to FIG. 1B, isolation tip valve 111 is closed and atmospheric tip valve 112 is open. When airflow control assembly 100 is in this configuration, it is referred to as an energized position. The energized position is a result of connector 137 receiving a signal and coupling the signal to solenoid coil 132. Solenoid coil 132 applies the received signal and produces a field that acts on armature 135. The action of the field on armature 135 results in movement of solenoid actuation rod 115.

During movement of solenoid actuation rod 115, isolation tip valve 111 is closed before atmospheric tip valve 112 is opened to isolate vacuum from airflow control assembly 100. Atmospheric tip valve 112 is then opened to allow airflow from second valve port 124 into the outer tube 151 and into the secondary chamber of the vacuum booster assembly (not shown). When airflow control assembly 100 is again de-energized, armature return spring 138 forces solenoid actuation rod 115 to return to the de-energized position (see FIG. 1A).

FIG. 2 is a cross sectional view illustrating an apparatus for providing airflow from a primary chamber to a secondary chamber of a vacuum booster assembly, within a vacuum booster system 200, according to another embodiment of the present invention. Vacuum booster system 200 includes airflow control assembly 210 and vacuum booster assembly 220. Vacuum booster system 200 additionally includes inner tube 250 and outer tube 251. Inner tube 250 is concentric to outer tube 251. Vacuum booster assembly 220 includes primary chamber 254 and secondary chamber 255. Primary chamber 254 is separated from secondary chamber 255 by chamber divider 258.

Outer tube 251 includes a first end and a second end. The first end of outer tube 250 is positioned in communication with secondary chamber 255. The first end of inner tube 250 passes through front housing 261 of vacuum booster assembly 220 to reach secondary chamber 255. The second end of outer tube 251 is coupled to a valve port of airflow control assembly 2210, such as, for example by sonic welding or mechanical attachment. In one embodiment, the second end of outer tube 251 is axially mounted to a valve port of airflow control assembly 210.

Outer tube 251 is coupled to front housing seal 260 that is coupled to front housing 261. In one embodiment, outer tube 251 is axially mounted to front housing seal 260. Front housing seal 260 may be implemented as, for example, a divider grommet manufactured from materials, such as elastomers. Front housing seal 260 may be implemented in other configurations, such as, for example as a housing seal (part # 5461808) manufactured by Delphi Corp of Troy, Mich.

The first end of outer tube 251 is coupled to secondary dynamic seal 257 that is coupled to and within secondary chamber 255. In one embodiment, the second end of outer tube 251 is axially mounted to secondary dynamic seal 257. In an example, secondary dynamic seal 257 is implemented as a diaphragm manufactured from materials, such as elastomers. In another example, secondary dynamic seal 257 may be implemented such as, for example as a diaphragm (part # 18060744 and 18060744) manufactured by Delphi Corp of Troy, Mich. Outer tube 251 may be manufactured from materials, such as, for example elastomers.

Inner tube 250 includes a first end and a second end. The first end of outer tube 250 is positioned in communication with primary chamber 254. The first end of inner tube 250 passes through front housing 261 of vacuum booster assembly 220, transits secondary chamber 255, and passes through chamber divider 258 to reach primary chamber 254. The second end of inner tube 250 is coupled to a valve port of airflow control assembly 210, such as, for example by an o-ring 252 and a star retainer 253. In an example and referring to FIGS. 1A and 1B, the second end of inner tube 250 is coupled to first valve port 120.

O-ring 252 surrounds inner tube 250 to provide a positive seal between inner tube 250 and a valve port, such as, for example first valve port 120 as detailed in FIGS. 1A and 1B, above. Star retainer 253 surrounds inner tube 250 and includes protrusions that extend into inner tube 250. O-ring 252 may be manufactured from materials, such as, for example elastomers. Star retainer 253 may be manufactured from materials, such as, for example spring steel or polymers.

Inner tube 250 is coupled to chamber divider seal 259 that is coupled to chamber divider 258. In one embodiment, inner tube 250 is axially mounted to chamber divider seal 259. In one embodiment, chamber divider seal 259 may be implemented as a seal manufactured from materials, such as elastomers, EPDM, or SBR rubber. In another example, chamber divider seal 259 may be implemented such as, for example as a seal (part # 18060842) manufactured by Delphi Corp of Troy, Mich.

The first end of inner tube 250 is coupled to primary dynamic seal 256 that is coupled to and within primary chamber 254. In one embodiment, the second end of inner tube 250 is axially mounted to primary dynamic seal 256. In an example, the primary dynamic seal 256 is implemented as a diaphragm manufactured from materials, such as elastomers, EPDM, or SBR rubber. In another example, primary dynamic seal 256 may be implemented such as, for example as a dynamic low friction seal (part # 18060728) manufactured by Delphi Corp of Troy, Mich. Inner tube 250 may be manufactured from materials, such as, for example polymers.

In operation, air flows from primary chamber 254 to airflow control assembly 210 via inner tube 250. The air flowing through inner tube 250 is referred to as system airflow. In one embodiment and referring to FIGS. 1A and 2, system airflow flows from airflow control assembly 210 to secondary chamber 255 via outer tube 251. In another embodiment and referring to FIGS. 1B and 2, atmospheric airflow flows from airflow control assembly 210 to secondary chamber 255 via outer tube 251. The duration and type of airflow delivered to secondary chamber 255 from airflow control assembly 210 via outer tube 251 controls functionality of vacuum booster assembly 220 and therefore vacuum booster system 200.

Figure 3:
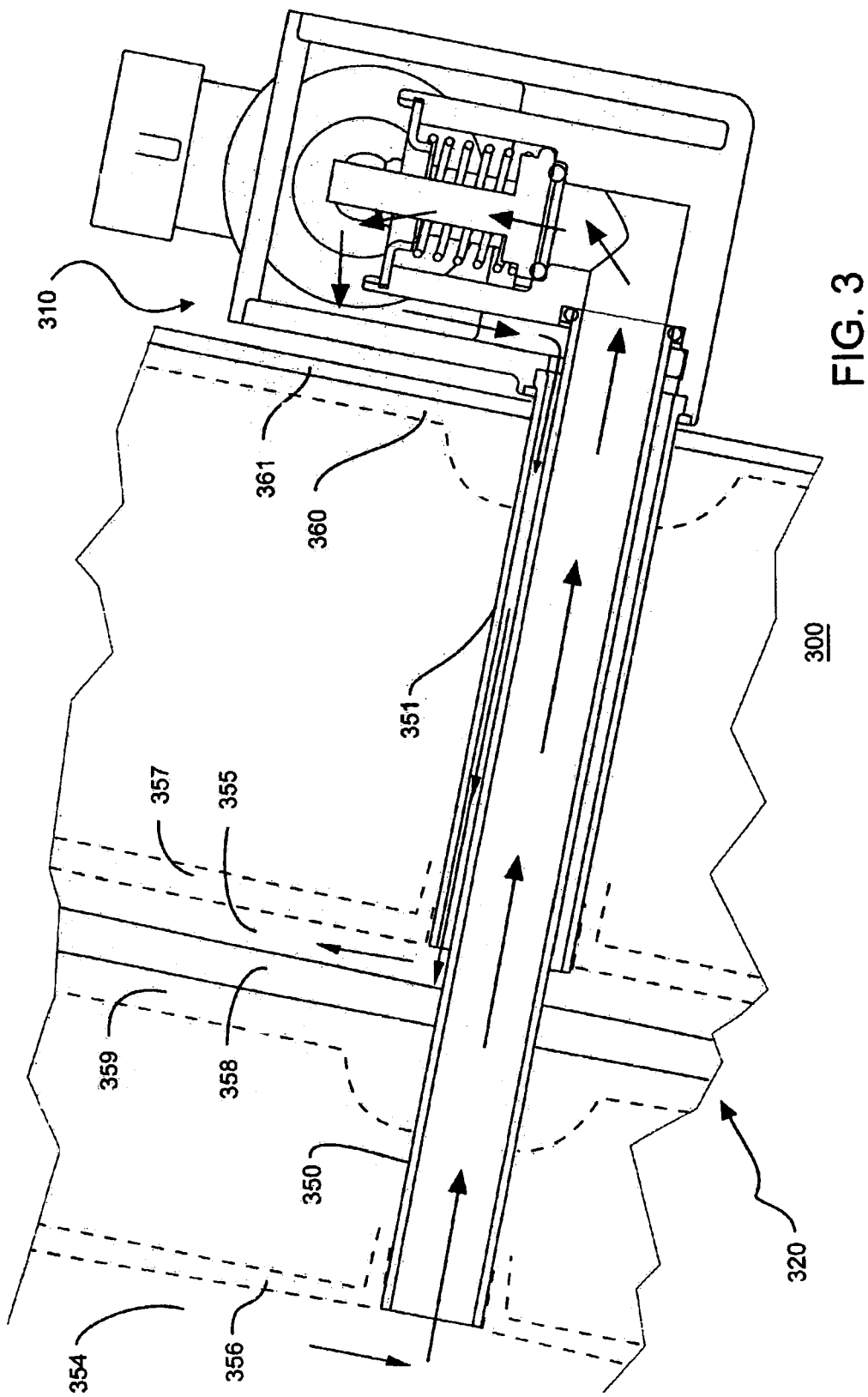
FIG. 3 is an cross sectional view illustrating an apparatus for providing airflow from a primary chamber to a secondary chamber of a vacuum booster assembly, within a vacuum booster system, according to another embodiment of the present invention.

FIG. 3 is a cross sectional view illustrating airflow within an apparatus for providing airflow from a primary chamber to a secondary chamber of a vacuum booster assembly, within a vacuum booster system, according to another embodiment of the present invention. Vacuum booster system 300 includes airflow control assembly 310 and vacuum booster assembly 320. Vacuum booster system 300 additionally includes outer tube 351 and inner tube 350. Inner tube 350 is concentric to outer tube 351. Vacuum booster assembly 320 includes primary chamber 354 and secondary chamber 355. Primary chamber 354 is separated from secondary chamber 355 by chamber divider 358. Vacuum booster assembly 320 additionally includes front housing 361, front housing seal 360, secondary dynamic seal 357, chamber divider seal 359, and primary dynamic seal 356. In FIG. 3, components function substantially the same and are located in substantially the same positions as identically named components of FIGS. 1A and 1B and FIG. 2 above.

In operation, air flows from primary chamber 354 to airflow control assembly 310 via inner tube 350. The air flowing through inner tube 350 is referred to as system airflow. In one embodiment and referring to FIG. 1A and FIGS. 2 and 3, system airflow flows from airflow control assembly 310 to secondary chamber 355 via outer tube 351. In another embodiment and referring to FIG. 1B and FIGS. 2 and 3, atmospheric airflow flows from airflow control assembly 310 to secondary chamber 355 via outer tube 351. The duration and type of airflow delivered to secondary chamber 355 from airflow control assembly 310 via outer tube 351 controls functionality of vacuum booster assembly 320 and therefore vacuum booster system 300.

Figure 4:
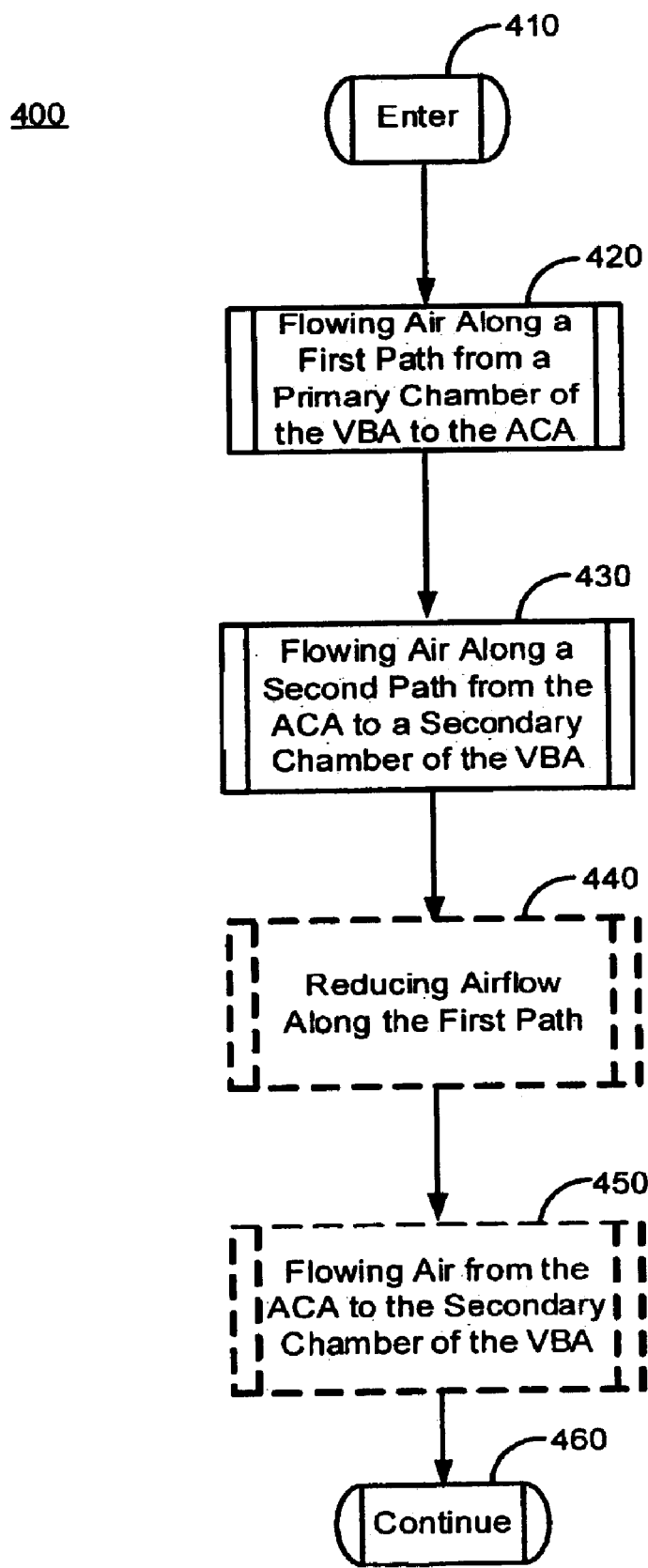
FIG. 4 is a flow diagram illustrating a method for providing airflow from a primary chamber to a secondary chamber of a vacuum booster assembly according to an embodiment of the present invention.

FIG. 4 is a flow diagram illustrating a method for providing airflow from a primary chamber to a secondary chamber of a vacuum booster assembly, according to an embodiment of the present invention. Method 400 may utilize one or more systems detailed in FIGS. 1A and 1B and FIGS. 2 and 3, above. Method 400 begins at block 410.

At block 420, air is flowed along a first path from a primary chamber of a vacuum booster assembly (VBA) to an airflow control assembly (ACA). In one embodiment, air flows from the primary chamber of the vacuum booster assembly (VBA) to the airflow control assembly (ACA) via an inner tube. In an example and referring to FIG. 1A and FIGS. 2 and 3, air flows from primary chamber (254, 354) of vacuum booster assembly (220, 320) to airflow control assembly (210, 310) via inner tube (250, 350). Air flowing through inner tube (250, 350) is referred to as system airflow.

At block 430, air is flowed along a second path from the airflow control assembly (ACA) to a secondary chamber of the vacuum booster assembly (VBA). In one embodiment, air flows from the airflow control assembly (ACA) to the secondary chamber vacuum booster assembly (VBA) via an outer tube. In an example and referring to FIG. 1A and FIGS. 2 and 3, air flows from airflow control assembly (210,310) to secondary chamber (255, 355) of vacuum booster assembly (220, 320) via outer tube (251, 351).

At optional block 440, airflow along the first path is reduced. In one embodiment, air flowing within the inner tube is reduced. In an example and referring to FIGS. 1A and 1B and FIG. 3, isolation tip valve 111 is moved from an open position to a closed position. Closing tip valve 111 results in a reduction or elimination of air flowing within inner tube 350.

At optional block 450, atmospheric air is flowed from the airflow control assembly (ACA) to the secondary chamber of the vacuum booster assembly (VBA). In one embodiment, air flows from the airflow control assembly (ACA) to the secondary chamber vacuum booster assembly (VBA) via an inner tube. In an example and referring to FIGS. 1A and 1B and FIGS. 2 and 3, atmospheric tip valve 112 is moved from a closed position to an open position. Isolation tip valve 111 is closed before atmospheric tip valve 112 is opened to isolate vacuum from airflow control assembly 100. Opening atmospheric tip valve 112 results in air flowing from second valve port 124 to secondary chamber (255, 355) of vacuum booster assembly (220, 320) via inner tube (250, 350).

At block 460, the method ends.

The above-described system and method for improved controlled airflow within a vacuum booster system is an example system and method. The system and method for improved controlled airflow within a vacuum booster system illustrate one possible approach for improving controlled airflow within a vacuum booster system. The actual implementation may vary from the package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

We claim:

1. A vacuum booster system, the system comprising:
   a vacuum booster assembly, the vacuum booster assembly having a primary chamber and a secondary chamber;
   an outer tube having a first end and a second end, the first end in communication with the secondary chamber of the vacuum booster assembly, the outer tube operably coupled to the secondary chamber by a dynamic seal including a diaphragm;
   an airflow control assembly, the airflow control assembly operably coupled to the second end of the outer tube; and
   an inner tube concentric to the outer tube, the inner tube having a first end and a second end, the first end of the inner tube operably coupled to the airflow control assembly, the second end of the inner tube in communication with the primary chamber of the vacuum booster assembly;
   wherein air flows from the primary chamber of the vacuum booster assembly to the airflow control assembly within the inner tube and air flows from the airflow control assembly to the secondary chamber of the vacuum booster assembly within the outer tube.

2. The system of claim 1, further comprising:
   a chamber divider between the primary chamber and the secondary chamber;
   wherein the inner tube passes through the chamber divider and a portion of the inner tube adjacent to the divider is operably coupled to the chamber divider.

3. The system of claim 2, wherein the inner tube is operably coupled to the chamber divider of vacuum booster assembly by a static seal.

4. The system of claim 3, wherein the seal is manufactured from a material of the group consisting of: elastomers, EPDM, and SBR rubber.

5. The system of claim 1, wherein the airflow via the inner tube is system airflow.

6. The system of claim 1, wherein the airflow via the outer tube is an atmospheric airflow.

7. The system of claim 1, wherein the outer tube is mounted utilizing a single mounting point on the vacuum booster assembly.

8. The system of claim 1, wherein the outer tube is axially mounted to the secondary chamber and the inner tube is axially mounted to a chamber divider and axially mounted to the primary chamber.

9. The system of claim 1, wherein the outer tube is operably coupled to the airflow control assembly by a method selected from the group consisting of: sonic welding and mechanical attachment.

10. The system of claim 1, wherein the inner tube is operably coupled to a valve within the airflow control assembly by a seal.

11. The system of claim 10, wherein the seal is a locking seal.

12. A vacuum booster system, the system comprising:
    a vacuum booster assembly, the vacuum booster assembly having a primary chamber and a secondary chamber;
    an outer tube having a first end and a second end, the first end in communication with the secondary chamber of the vacuum booster assembly;
    an airflow control assembly, the airflow control assembly operably coupled to the second end of the outer tube; and
    an inner tube concentric to the outer tube, the inner tube having a first end and a second end, the first end of the inner tube operably coupled to the airflow control assembly with a locking seal, the second end of the inner tube in communication with the primary chamber of the vacuum booster assembly, the locking seal including an o-ring surrounding the inner tube and a star retainer surrounding the inner tube and having protrusions that extend into the inner tube wherein the o-ring provides a positive seal between the inner tube and the valve and wherein the star retainer retains the inner tube attachment to the valve;
    wherein air flows from the primary chamber of the vacuum booster assembly to the airflow control assembly within the inner tube and air flows from the airflow control assembly to the secondary chamber of the vacuum booster assembly within the outer tube.

13. The system of claim 12, wherein the inner tube is operably coupled to the primary chamber of vacuum booster assembly by a seal.

14. The system of claim 13, wherein the seal is a dynamic seal including a diaphragm.

15. The system of claim 13, wherein the seal is manufactured from a material of the group consisting of: elastomers, EPDM, and SBR rubber.

16. An airflow control assembly for a vacuum brake booster comprising:
   a first tip valve including an first tip valve spring to close the first tip valve;
   a second tip valve including an second tip valve spring to close the second tip valve, the first tip valve spring and second tip valve spring configured to bias one of the first tip valve and second tip valve closed while the other of the first tip valve and second tip valve is closed; and
   a solenoid rod configured to move in response to a field, the second tip valve configured to be axially actuated by the solenoid rod, and the first tip valve configured to be perpendicularly actuated by the solenoid rod; and
   an inner tube concentric with an outer tube, the inner tube connecting to a primary working chamber and the outer tube connecting to a secondary working chamber wherein opening the first tip valve results in an atmospheric airflow through the outer tube and wherein opening the second tip valve results in a system airflow through the inner tube.

17. The assembly of claim 16 wherein the outer tube is operably attached to a main body using a method selected from the group consisting of sonic welding and mechanical attachment.

18. The assembly of claim 16 further comprising:
   a chamber divider between the primary chamber and the secondary chamber;
   wherein the inner tube passes through the chamber divider and a portion of the inner tube adjacent to the divider is operably coupled to the chamber divider.

19. A method for providing airflow from a primary chamber to a secondary chamber, the method comprising:
   applying a field to a solenoid operably connected to a first tip valve and a second tip valve to move the solenoid to actuate one of the first tip valve and the second tip valve;
   flowing an atmospheric airflow through an outer tube in response to actuating the first tip valve; and
   flowing a system airflow through an inner tube concentric with the outer tube in response to actuating the second tip valve.

* * * * *